US008547484B2

(12) United States Patent
Inohiza

(10) Patent No.: US 8,547,484 B2
(45) Date of Patent: Oct. 1, 2013

(54) COMMUNICATION SYSTEM FOR SYNTHESIZING AND OUTPUTTING A PLURALITY OF PIECES OF VIDEO DATA, DEVICE FOR DETERMINING QUALITY OF VIDEO DATA TO BE SYNTHESIZED AND OUTPUT, CONTROL METHOD THEREOF, AND PROGRAM

(75) Inventor: Hirohiko Inohiza, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 13/361,524

(22) Filed: Jan. 30, 2012

(65) Prior Publication Data

US 2012/0194744 A1    Aug. 2, 2012

(30) Foreign Application Priority Data

Feb. 2, 2011   (JP) .................................. 2011-020646

(51) Int. Cl.
*H04N 9/67* (2006.01)
(52) U.S. Cl.
USPC ............................. 348/659; 348/180; 348/584
(58) Field of Classification Search
USPC ................. 348/659–660, 180, 184, 143, 153, 348/159, 333.01, 584, 588, 581, 564, 552–553, 348/566, 744–745, 455; 345/762–763, 778, 345/784, 788, 723, 803–810
IPC ....................................................... H04N 9/67
See application file for complete search history.

(56) References Cited

U.S. PATENT DOCUMENTS

| 5,621,429 | A * | 4/1997 | Yamaashi et al. ............. 715/803 |
| 6,791,624 | B1 * | 9/2004 | Suga .............................. 348/588 |
| 6,829,005 | B2 * | 12/2004 | Ferguson ...................... 348/180 |
| 7,262,791 | B2 * | 8/2007 | Kohno et al. .................. 348/153 |
| 8,199,196 | B2 * | 6/2012 | Klein et al. .................... 348/143 |

FOREIGN PATENT DOCUMENTS

| JP | 2000-078116 A | 3/2000 |
| JP | 2004-032604 A | 1/2004 |
| JP | 2010-213190 A | 9/2010 |
| JP | 2010-213191 A | 9/2010 |

\* cited by examiner

*Primary Examiner* — Trang U Tran
(74) *Attorney, Agent, or Firm* — Canon U.S.A., Inc. IP Division

(57) ABSTRACT

A communication system that transmits a plurality of pieces of video data to be synthesized and output to a plurality of output apparatus after dividing into a plurality of pieces of video having different qualities, in which, in a case where the plurality of pieces of video data are transmitted to the plurality of apparatus to synthesize and output the data, it is so configured that a difference in video quality is made so as not to be remarkable even when each apparatus cannot receive the video data having the same quality, wherein a reception state of the video data in each output apparatus of the plurality of output apparatus is determined and the quality of the video data to be synthesized and output is decided according to the reception state of the video data in each output apparatus, thereby outputting the video data having thus decided quality.

9 Claims, 10 Drawing Sheets

COMMUNICATION SYSTEM FOR SYNTHESIZING AND OUTPUTTING A PLURALITY OF PIECES OF VIDEO DATA, DEVICE FOR DETERMINING QUALITY OF VIDEO DATA TO BE SYNTHESIZED AND OUTPUT, CONTROL METHOD THEREOF, AND PROGRAM

BACKGROUND OF THE INVENTION

1. Field of the Invention

The present invention relates to a technique in which a plurality of pieces of video data to be synthesized and output is transmitted to a plurality of devices, thereby synthesizing and outputting the data.

2. Description of the Related Art

There is a system in which a plurality of pieces of divided video data is projected by using a plurality of projectors and a projectional image is synthesized therewith to display large screen video thereof, a system in which a plurality of images of projectors having insufficient luminance is overlapped with one another to display an overlapped image, and a system in which a right image and a left image overlap each other to display a three dimensional (3D) video. As screen sizes have increased, the distance between a projector and video source apparatus has increased, which has resulted in a demand for wireless video data transmission systems to overcome the issue of running wires over the increased distance.

In order to perform stable data transmission between nodes connected to each other via a wireless communication path, there is a method in which a plurality of pieces of data having different levels of detail is generated from a single piece of data to transmit the generated plurality of pieces of data. For example, Japanese Patent Laid-open Publication No. 2000-78116 discusses a transmission device that generates a high quality signal and a low quality signal based on a single piece of broadcasting digital data and transmits the generated signals differently-timed and a reception device that receives the high quality signal in a normal reception mode to reproduce the signal and receives the low quality signal in a fault mode to reproduce the signal.

Japanese Patent Laid-open Publication No. 2004-32604 discusses a transmission device that separately transmits a plurality of pieces of data generated from a single piece of information but having different compression ratios by using a plurality of transmission channels having different transmission rates and a reception device that switches the transmission channels to be used based on an error rate of the transmission channel in receiving the data. Japanese Patent Laid-open Publication No. 2010-213190 discusses a transmission node that transmits uncompressed video data by using a high speed transmission channel and transmits compressed video data by using a low speed transmission channel, respectively, and a reception node that reproduces the uncompressed video data when a high speed transmission channel can receive the data and reproduces the compressed video data when the high speed transmission channel is blocked, respectively. Japanese Patent Laid-open Publication No. 2010-213191 discusses a transmission node that transmits compressed video data by using a low speed transmission channel and transmits loss data that misses during the compression of the video data by using a high speed transmission channel, respectively, and a reception node that reproduces video by synthesizing data produced by decompressing the compressed video data with the loss data.

However, with the conventional technique, in a case of a wireless multi-projection system where video data is transmitted to each of a plurality of destination nodes connected to projectors, video quality of video data output from each destination node is difficult to homogenize. For example, in a case of a system in which a single piece of video is divided into right video, left video, upper video, and lower video to transmit the plurality of pieces of video, if the video qualities in all the pieces of the divided video are not homogenized, a low quality video disturbance can occur that affects the quality of the video being displayed. Specifically, in a case where an object contained in video, such as scenery or a person, lies astride the left video and the right video, a difference in video quality between the right video and the left video becomes remarkable. Further, in a case of providing edge blending processing such that portions of the plurality of pieces of the divided video overlap with one another to adjust a luminance of joint between the video and the video so as not to make the joint imperceptible, if the plurality of pieces of video having different qualities overlap one another, the joint becomes rather remarkable. Also, in a case where the plurality of pieces of video overlap with one another in order to improve 3D video and a luminance thereof, if high quality video and low quality video overlap each other, a disturbance of the low quality video becomes remarkably visible and thus a degradation of video quality in its entirety becomes remarkable.

SUMMARY OF THE INVENTION

One aspect of the present invention is directed to a technique that, in a case where a plurality of pieces of video data is transmitted to a plurality of devices to synthesize and output the video data, a difference in video quality does not become remarkable even if each device cannot receive video having the same quality.

According to an aspect of the present invention, a communication system configured to divide a plurality of pieces of video data to be synthesized and output into a plurality of pieces of video having different qualities and transmit thereof to a plurality of output apparatus includes a determination unit configured to determine a reception state of the video data in each output apparatus of the plurality of output apparatus, a decision unit configured to decide a quality of the video data to be synthesized and output according to the reception state of the video data in each output apparatus determined by the determination unit, and an output unit configured to output the video data having the quality decided by the decision unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
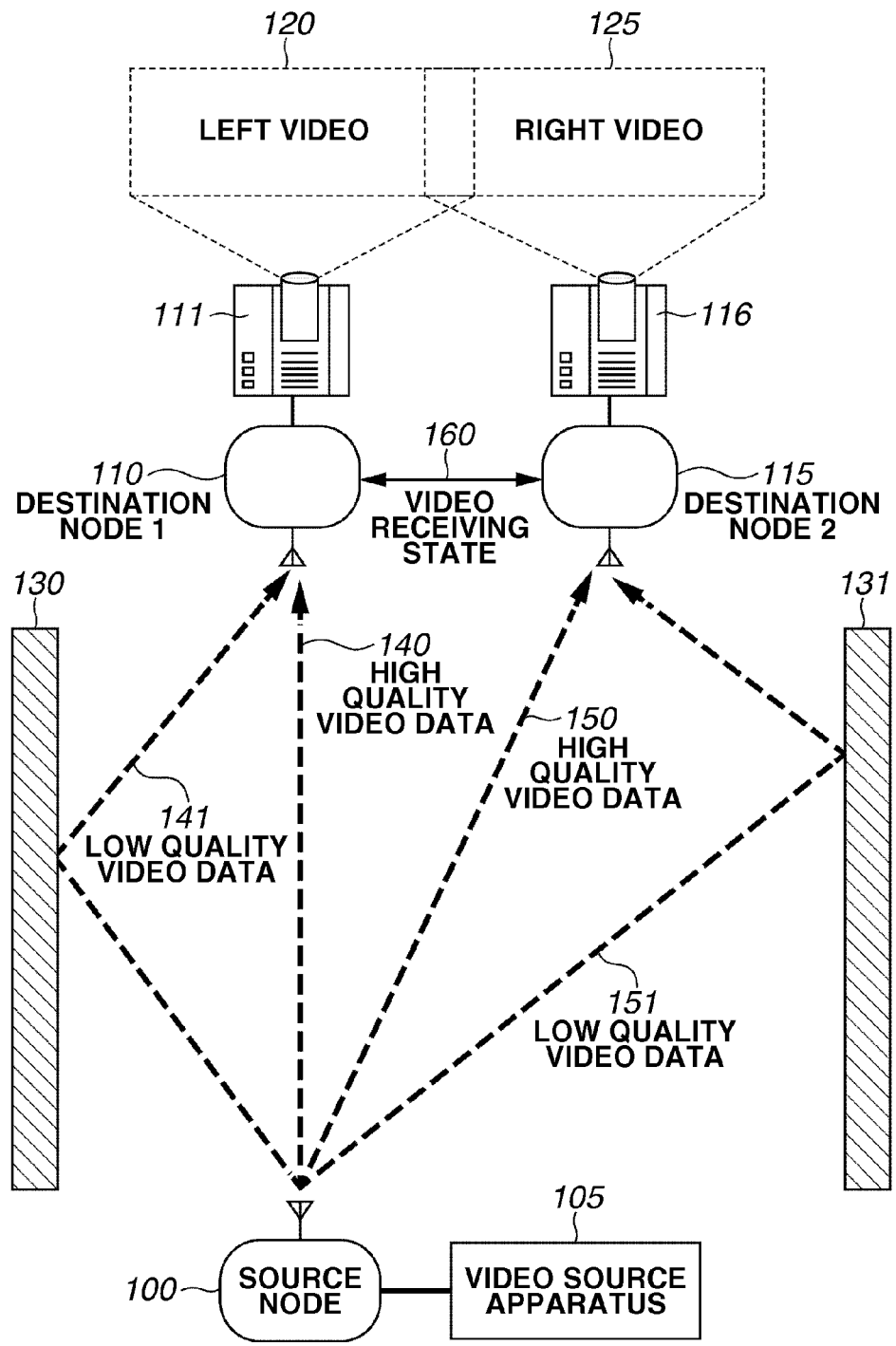
FIG. 1 illustrates a network configuration according to a first exemplary embodiment.

FIG. 1 illustrates an example of a network configuration of a communication system according to a first exemplary embodiment. The present system is a multi-projection output system in which video data, based on a single video source having been divided into left video and right video, are transmitted by a wireless transmission, where each divided video is projected using two projectors, and the projected images are synthesized to display large screen video thereof.

A source node 100 transmits, via wireless transmission, video data of each of the left video and the right video obtained from video source apparatus 105 to destination node 1 (110) and destination node 2 (115), respectively. The video source apparatus 105 evenly divides the video source into left video data 120 and right video data 125 and outputs each video data to the source node 100. The destination node 1 (110) and the destination node 2 (115) are output apparatuses that output the received video data to each of the projectors 111 and 116, respectively. The projector 111 projects the left video data 120 and the projector 116 projects the right video data 125, thereby realizing a large screen display in which the left video is synthesized with the right video. In the following description, the projectors are independent from the destination nodes. However, the destination nodes may have a function of the projectors.

In the present exemplary embodiment, in order to improve reliability of data transmission, the source node 100 transmits high quality video data and low quality video data generated from a single piece of video data to the destination nodes by using a plurality of communication paths which are different from one another. Communication paths 140, 141, 150, and 151 are used in transmitting the video data. The communication paths 140 and 150 directly transmit the video data from the source node 100 to the destination node, whereas, the communication paths 141 and 151 transmit the video data by using a reflection function of a reflective objects 130 and 131, such as walls. Accordingly, even if one of the communication paths is blocked, a communication can be continued without a break of reproduction of video as far as any one of the communication paths can perform the data transmission.

Each destination node receives video data from the plurality of communication paths and exchanges a video reception state 160 that has been able to receive with that of the other destination node, thereby determining video qualities of the video data to be output to the two projectors. In the present exemplary embodiment, the number of communication paths used for the purpose of enhancing the reliability of the data transmission is, but not limited to, two with respect to each projector. The number of communication paths may be greater than three in a case where further enhancement of the reliability is needed. In the following description, the communication path 140 is represented by a path 1, the communication path 141 by a path 2, the communication path 150 by a path 3, and the communication path 151 by a path 4, respectively.

Figure 2:
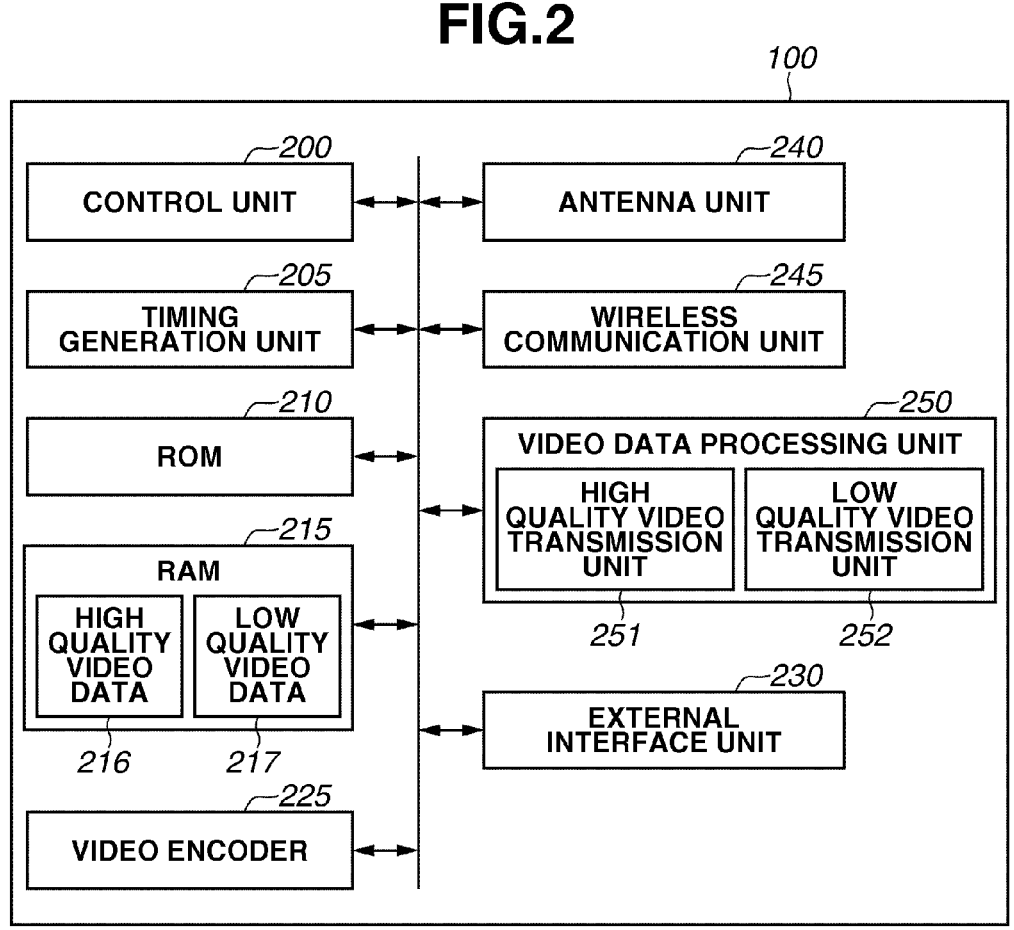
FIG. 2 is a block diagram illustrating a source node according to the first exemplary embodiment and a second exemplary embodiment.

FIG. 2 is a block diagram illustrating an internal configuration of the source node 100. A control unit 200 controls operations in the source node 100. A timing generation unit 205 includes a timer unit for generating timing of performing transmission processing. A Read-only Memory (ROM) 210 stores a program and a nonvolatile parameter of the source node 100. A Random Access Memory (RAM) 215 stores the nonvolatile parameter and data. High quality video data 216 is received from the video source apparatus 105 or generated by a video encoder 225 based on the video data received from the video source apparatus 105. Low quality video data 217 is generated by the video encoder 225 based on the video data received from the video source apparatus 105. Both the high quality video data 216 and the low quality video data 217 are stored in the RAM 215. The video encoder 225 provides compression processing to each of the left video data and the right video data received from the video source apparatus 105 and generates the left high quality video data and the right high quality video data as well as left low quality video data and right low quality video data. The left low quality video data and the right low quality video data have video qualities lower than and data amount less than those of the left high quality video data and right high quality video data. Operations of the source node 100 according to the present exemplary embodiment are executed such that the control unit 200 reads out a control program stored in the ROM. 210 to execute it, thereby controlling each unit of the source node 100.

An external interface unit 230 is connected to the video source apparatus 105 to receive video data therefrom. An antenna unit 240 transmits/receives radio wave signals from a wireless communication unit 245. The wireless communication unit 245 performs signal processing upon transmission and reception thereof, including modulation and demodulation of wireless data. A video data processing unit 250 associates a header and acyclic redundancy check (CRC) code necessary for video data with the video data and converting the video data into a packet as wireless data. A high quality video transmission unit 251 transmits the left and the right high quality video data 216 by using the communication paths selected by the source node 100. A low quality video transmission unit 252 transmits the left and the right low quality video data 217. Both of the high quality video transmission unit 251 and the low quality video transmission unit 252 are included in the video data processing unit 250.

Figure 3:
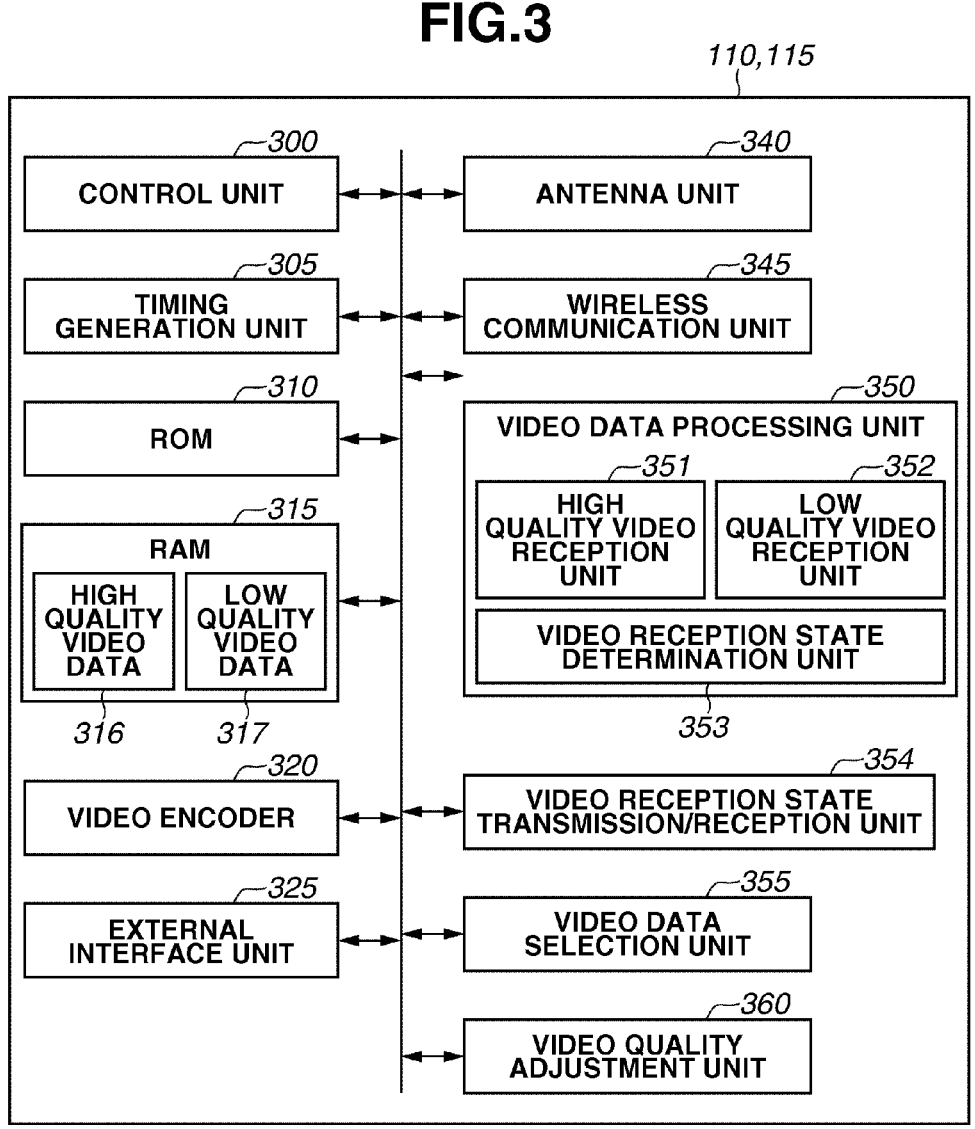
FIG. 3 is a block diagram illustrating a destination node according to the first and the second exemplary embodiments.

FIG. 3 is a block diagram illustrating an internal configuration of a destination node. A control unit 300 controls operations in the destination node. A timing generation unit 305 includes a timer unit for generating timing for performing transmission and reception processing. A ROM 310 stores a program and a nonvolatile parameter of the destination node. A RAM 315 stores the nonvolatile parameter and data. High quality video data 316 is received via wireless communication. Low quality video data 317 is received via the wireless communication. Both of the high quality video data 316 and the low quality video data 317 are stored in the RAM 315. A video decoder 320 provides decompression processing with respect to compressed data contained in the high quality video data 316 and the low quality video data 317 thus received. Operations of the destination nodes 110 and 115 according to the present exemplary embodiment are executed such that the control unit 300 reads out a control program stored in the ROM 310 to execute it, thereby controlling each unit of the destination nodes 110 and 115.

An external interface unit 325 is connected to a projector for the purpose of outputting the video data having a quality selected by a video data selection unit 355 to the projector. An antenna unit 340 transmits/receives radio wave signals from the wireless communication unit 345. The wireless communication unit 345 provides signal processing upon transmission and reception containing modulation/demodulation of wireless data. A video data processing unit 350 removes the header and the CRC code from the received packet of the wireless data and extracts the video data. A high quality video reception unit 351 receives the high quality video data 316 by using the communication path selected by the source node 100. A low quality video reception unit 352 receives the low quality video data 317 by using the communication path selected by the source node 100. A video reception state determination unit 353 determines whether each of the high quality video data and the low quality video data can be received correctly. The determination is performed by using the CRC code associated with the wireless data packet. The high quality video reception unit 351, the low quality video reception unit 352, and the video reception state determination unit 353 are included in the video data processing unit 350. In another embodiment, each of these units can be provided as independent units outside of the video data processing unit 350.

A video reception state transition/reception unit 354 notifies its own video reception state to the other destination node and obtains a video reception state from the other destination node. A video data selection unit 355 selects video quality of the video data to be output to the external interface unit 325 according to its own video reception state and the video reception state of the other destination node. A video quality adjusting unit 360 adjusts the video quality by extracting or generating the low quality video data from the high quality video data 316 in a case where the video data selection unit 355 determines to output the low quality video data, but only has the high quality video data 316.

Figure 4:
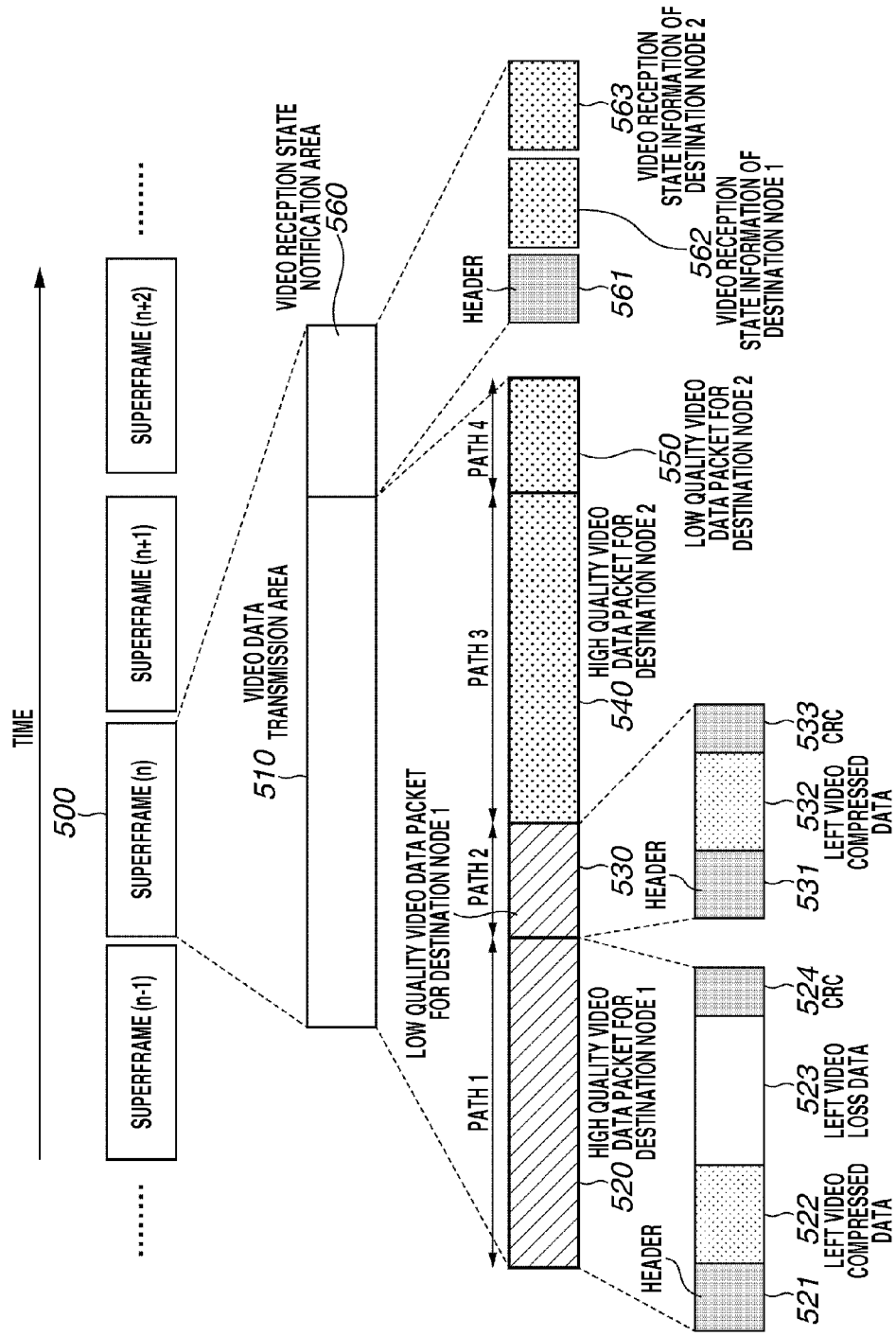
FIG. 4 illustrates a communication frame configuration according to the first exemplary embodiment.

FIG. 4 illustrates a configuration of a superframe 500 corresponding to a communication frame in the wireless communication system according to the present exemplary embodiment. The superframe 500 has a fixed length and is transmitted at a repetition period as an effective period of the video data. The superframe 500 includes two communication areas, such as a communication area 510 for the video data transmission and a communication area 560 for the video reception state notification of each destination node. The source node 100 transmits the superframe 500 at the repetition period as the effective period of the video data according to the timing generated by the timing generation unit 205. The destination node receives the superframe 500 at the repetition period as the effective period of the video data according to the timing generated by the timing generation unit 305.

In the video data transmission area 510, the source node 100 transmits the video data for the destination node 1 (110) and the video data for the destination node 2 (115) by using the plurality of communication paths different from each other. In an area 520, the high quality video data is transmitted by using a path 1. In an area 530, the low quality video data is transmitted by using the path 2. Both of the high quality video data of the area 520 and the low quality video data of the area 530 are generated from a single left video data and transmitted to the destination node 1 (110). In an area 540, the high quality video data is transmitted by using a path 3. In an area 550, the low quality video data is transmitted by using a path 4. Both of the high quality video data of the area 540 and the low quality video data of the area 550 are generated from a single right video data and transmitted to the destination node 2 (115).

A high quality video data packet for the destination node 1 (110) includes the header 521, the left video compressed data 522, the left video loss data 523, and the CRC 524 as components. The header 521 includes information such as identification information of the destination node, a size and a compression ratio of the compressed data 522, and a data size of the loss data 523. A reference of the header information enables the destination node to correctly receive the high quality video data addressed to the destination node itself. The area 522 stores compressed data generated such that the source node 100 provides the compression processing to the left video received from the video source apparatus 105. The area 523 stores the loss data deleted upon providing the compression processing. The destination node can decompress thus received compressed data and reproduce the high quality video by using it synthesized with the loss data. The area 524 stores the CRC code for detecting an error of the high quality video data packet in its entirety.

A low quality video data packet for the destination node 1 (110) includes a header 531, left video compressed data 532, and a CRC 533 as components. The header 531 contains information such as identification information of the destination node and a size and a compression ratio of the compressed data 532. A reference of the header information enables the destination node to correctly receive the low quality video data addressed to the destination node itself. The left video compressed data 532 stores compressed data generated such that the source node 100 provides the compression processing to the left video received from the video source apparatus 105. The CRC area 533 stores the CRC code for detecting an error of the low quality video data packet in its entirety. An area 540 also includes, similar to the area 520, a header, an area for the right video compressed data, an area for the loss data, and an area for the CRC code. Further, an area 550 includes, similar to the area 530, a header, an area for the right video compressed data, and an area for the CRC code.

A video reception state notifying area 560 includes a header 561, video reception state information of the destination node 1 (562), and video reception state information of the destination node 2 (563) as components. The header 561 stores information defining a transmission timing of the information of the video reception state of each destination node. A reference of the header information enables the destination node to determine a transmission timing of the video reception state information of the destination node itself. The video reception state information 562 of the destination node 1 (110) includes video reception state information indicating a video reception state of the destination node 1 (110) and the video reception state information 563 of the destination node 2 (115) includes video reception state information indicating the video reception state of the destination node 2 (115). By using the areas, an exchange of the video reception state is performed between the destination nodes. Each destination node determines the video quality of the video data to be used based on the information of the video reception state of all the destination nodes. As described above, two communication paths are used to transmit the video data to the respective destination nodes. Therefore, if the data of one of the communication paths can be received, the video can be reproduced within the effective period of the video data.

A flow of video data transmission processing according to the present exemplary embodiment is described below with reference to a sequence diagram attached hereto. Three operations are described one-by-one according to patterns of the reception states of the video data.

Figure 5:
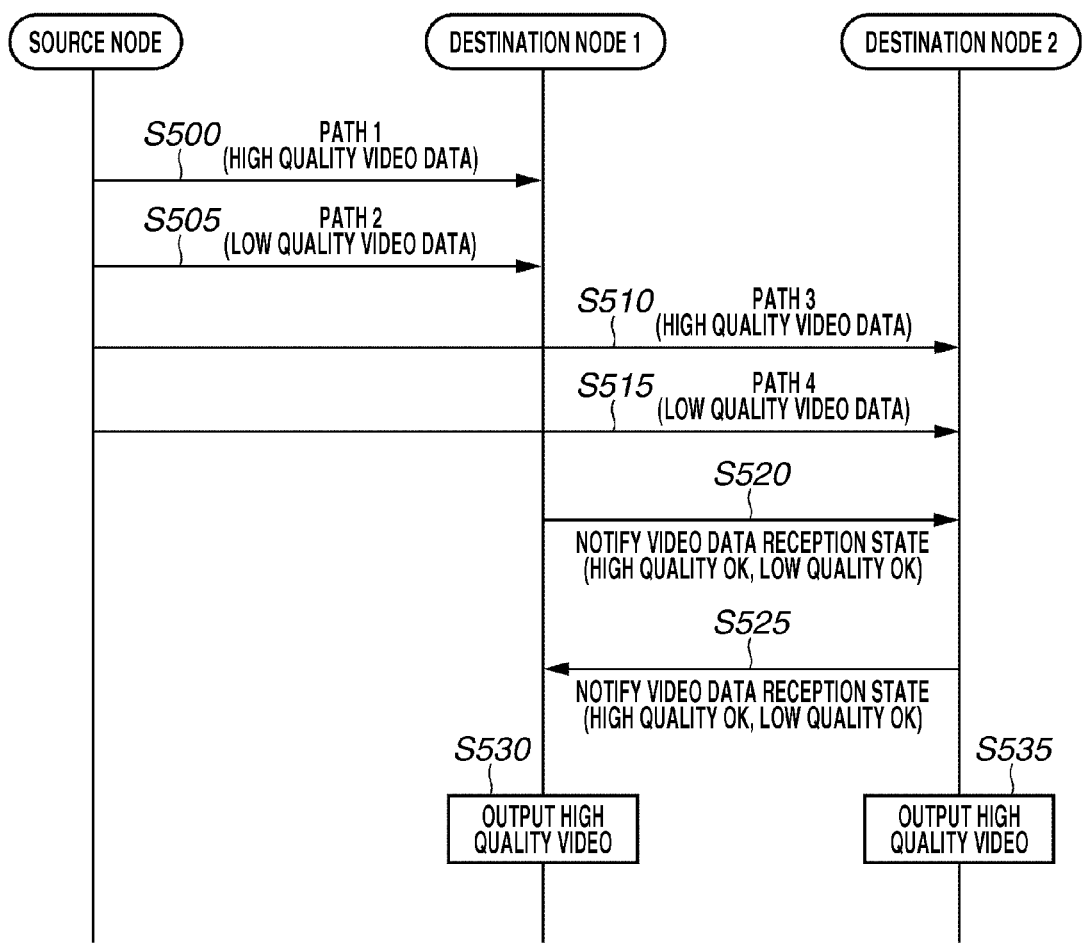
FIG. 5 illustrates a sequence for transmitting video data according to the first exemplary embodiment.

An operation in a case where no reception error occurs in the destination node with respect to the video data is described with reference to a sequence diagram of FIG. 5. In step S500, in the source node 100, the high quality video transmission unit 251 transmits the high quality video data to the destination node 1 (110) via the path 1. In step S505, the low quality video transmission unit 252 transmits the low quality video data to the destination node 1 (110) via the path 2. In the destination node 1 (110), it is assumed that the high quality video reception unit 351 successfully receives the high quality video data and the low quality video reception unit 352 successfully receives the low quality video data. As a result, the video reception state determination unit 353 of the destination node 1 (110) determines that both of the high quality video data and the low quality video data are successfully received.

In step S510, in the source node 100, the high quality video transmission unit 251 transmits the high quality video data to the destination node 2 (115) via the path 3. In step S515, the low quality video transmission unit 252 transmits the low quality video data to the destination node 2 (115) via the path 4. In the destination node 2 (115), it is assumed that the high quality video reception unit 351 successfully receives the high quality video data and the low quality video reception unit 352 successfully receives the low quality video data. As a result, the video reception state determination unit 353 of the destination node 2 (115) determines that both of the high quality video data and the low quality video data are successfully received.

In step S520, the destination node 1 (110) notifies the destination node 2 (115) that both the high quality video data and the low quality video data are successfully received. In step S525, in a similar manner, the destination node 2 (115) notifies the destination node 1 (110) that both the high quality video data and the low quality video data are successfully received. These notifications are made by the video reception state transition/reception unit 354 of each of the destination node 1 (110) and the destination node 2 (115).

In step S530, the video data selection unit 355 of the destination node 1 (110) determines the video quality of the video data to be output according to the video data reception states of the destination node 1 (110) and the destination node 2 (115). In this case, since both the destination node 1 (110) and the destination node 2 (115) can correctly receive the high quality video data and the low quality video data, the high quality video data is output to the projector. Similarly, in step S535, the video data selection unit 355 of the destination node 2 (115) determines the video quality of the video data to be output according to the video data reception states of the destination node 1 (110) and the destination node 2 (115). In this case, since both the destination node 1 (110) and the destination node 2 (115) can correctly receive the high quality video data and the low quality video data, the high quality video data is output to the projector.

As illustrated in the frame configuration of FIG. 4, in a case where the high quality video data includes the compressed data and the loss data, the compressed data is decompressed to synthesize it with the loss data, thereby generating the high quality video output data. Accordingly, the destination node 1 (110) and the destination node 2 (115) can homogenize the video quality of the video data to be output.

Figure 6:
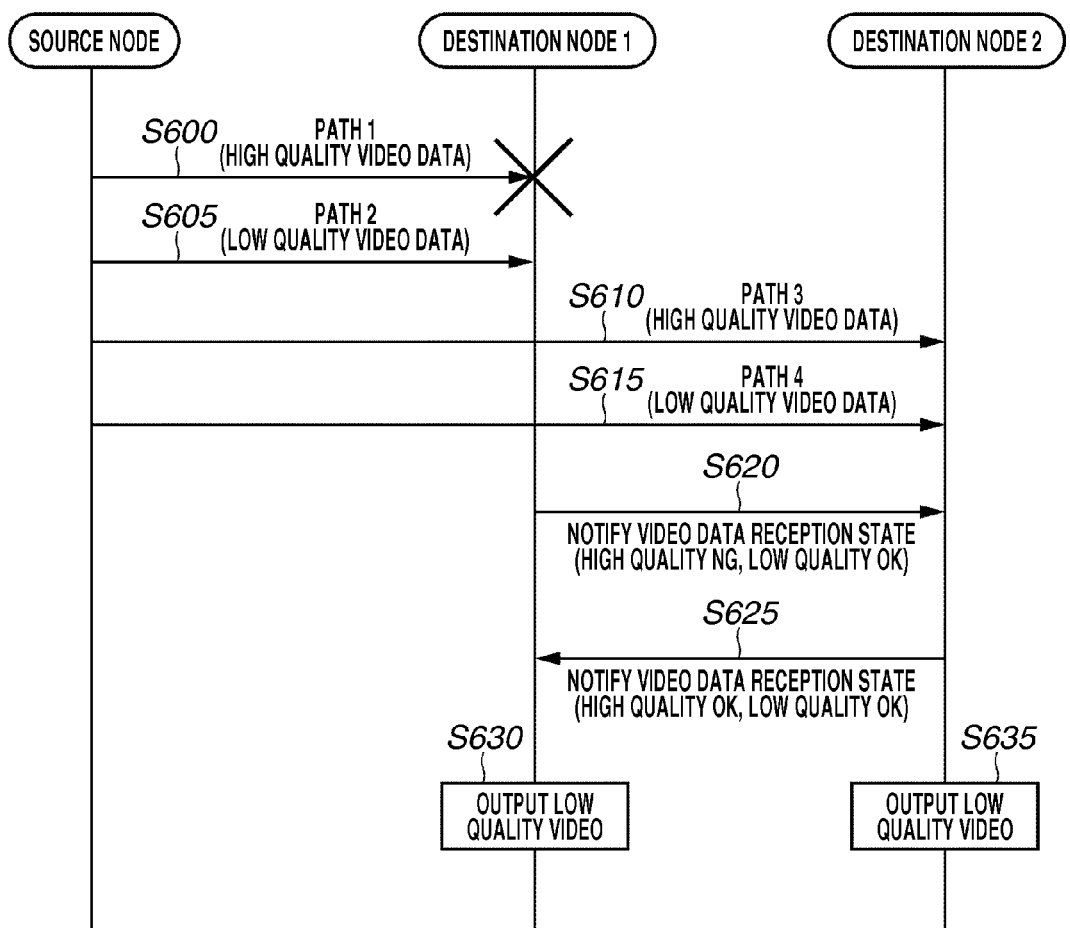
FIG. 6 illustrates a sequence for transmitting video data according to the first exemplary embodiment.

An operation performed in a case where a reception error of the high quality video data occurs in one of the destination nodes is described below with reference to a sequence diagram of FIG. 6. In step S600, in the source node 100, the high quality video transmission unit 251 transmits the high quality video data to the destination node 1 (110) via the path 1. In step S605, the low quality video transmission unit 252 transmits the low quality video data to the destination node 1 (110) via the path 2. It is assumed that in the destination node 1 (110), the high quality video reception unit 351 fails to receive the high quality video data via the path 1 and the low quality video reception unit 352 successfully receives the low quality video data via the path 2. As a result, the video reception state determination unit 353 of the destination node 1 (110) determines that the high quality video data failed to be received and the low quality video data is successfully received.

In step S610, in the source node 100, the high quality video transmission unit 251 transmits the high quality video data to the destination node 2 (115) via the path 3. In step S615, the low quality video transmission unit 252 transmits the low quality video data to the destination node 2 (115) via the path 4. It is assumed that in the destination node 2 (115), the high quality video reception unit 351 successfully receives the high quality video data and the low quality video reception unit 353 fails to receive the low quality video data. As a result, the video reception state transmission/reception unit 345 of the destination node 2 (115) determines that both the high quality video data and the low quality video data are successfully received.

In step S620, the video reception state transition/reception unit 345 of the destination node 1 (110) notifies the destination node 2 (115) that the high quality video data failed to be received and the low quality video data is successfully received. Similarly, in step S625, the video reception state transition/reception unit 345 of the destination node 2 (115) notifies the destination node 1 (110) that both the high quality video data and the low quality video data are successfully received.

In step S630, the video data selection unit 355 of the destination node 1 (110) determines the video quality of the video data to be output according to the reception states of the video data of the destination node 1 (110) and the destination node 2 (115). In this case, since the destination node 1 (110) itself fails to receive the high quality video data, the low quality video data correctly received is output to the projector. In a similar manner, in step S635, the video data selection unit 355 of the destination node 2 (115) also determines the video quality of the video data to be output according to the reception states of the video data of the destination node 1 (110) and the destination node 2 (115). In this case, since the destination node 1 (110) fails to receive the high quality video data, the low quality video data correctly received is output to the projector. As illustrated in the frame configuration of FIG. 4, in a case where the compressed data is used for the low quality video data, the destination node 1 (110) uses the data obtained by decompressing the compressed data received via the path 2 as output data. The destination node 2 (115) uses the data obtained by decompressing the compressed data received via the path 3 or the path 4 as the output data. As described above, the destination node 1 (110) and the destination node 2 (115) output the video data such that the video quality of the video data to be output from both the destination nodes to the projectors are accorded to the lower video quality of the video data among the correctly received video data. Accordingly, the video qualities of the video data output from the destination node 1 (110) and the destination node 2 (115) can be homogenized.

Figure 7:
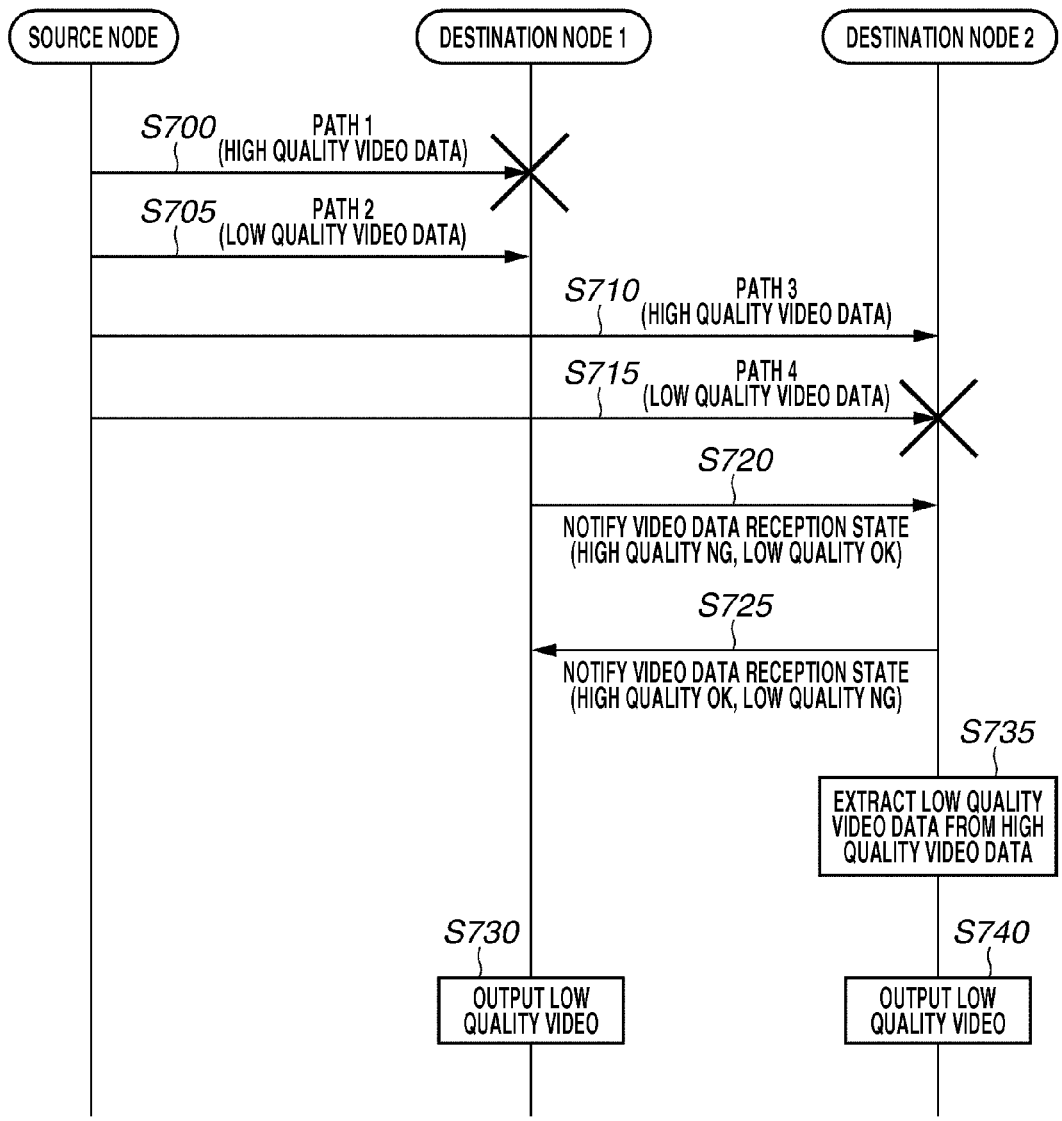
FIG. 7 illustrates a sequence for transmitting video data according to the first exemplary embodiment.

FIG. 7 illustrates a sequence diagram associated with an operation performed in a case where one of the destination nodes successfully receives only the high quality video data and the other one of the destination nodes successfully receives only the low quality video data.

In step S700, in the source node 100, the high quality video transmission unit 251 transmits the high quality video data to the destination node 1 (110) via the path 1. In step S705, the low quality video transmission unit 252 transmits the low quality video data to the destination node 1 (110) via the path 2. It is assumed that in the destination node 1 (110), the high quality video reception unit 351 fails to receive the high quality video data and the low quality video reception unit 352 successfully receives the low quality video data. As a result, the video reception state determination unit 354 of the destination node 1 (110) determines that the high quality video data failed to be received and the low quality video data is successfully received.

In step S710, in the source node 100, the high quality video transmission unit 251 transmits the high quality video data to the destination node 2 (115) via the path 3. In step S715, the low quality video transmission unit 252 transmits the low quality video data to the destination node 2 (115) via the path 4. In the destination node 2 (115), the high quality video reception unit 351 successfully receives the high quality video data and the low quality video reception unit 352 fails to receive the low quality video data. As a result, the video reception state determination unit 353 of the destination node 2 (115) determines that the high quality video data is successfully received and the low quality video data failed to be received.

In step S720, the destination node 1 (110) notifies the destination node 2 (115) that the video reception state transmission/reception unit 354 fails to receive the high quality video data and successfully receives the low quality video data. Similarly, in step S752, the destination node 2 (115) notifies the destination node 1 (110) that the video reception state transmission/reception unit 354 successfully receives the high quality video data and fails to receive the low quality video data.

In step S730, in the destination node 1 (110), the video data selection unit 355 determines the video quality of the video data to be output according to the reception states of the video data of the destination node 1 (110) and the destination node 2 (115). In this case, since the destination node 1 (110) itself fails to receive the high quality video data and successfully receives the low quality video data and the destination node 2 (115) successfully receives the high quality video data and fails to receive the low quality video data, the low quality video data is output to the projector. Therefore, the destination node 1 (110) outputs the low quality video data received via the path 2 in step S705 to the projector.

Similarly, the destination node 2 (115) also determines the video quality of the video data to be output according to the video data reception states of the destination node 1 (110) and the destination node 2 (115). In this case, since the destination node 1 (110) fails to receive the high quality video data and successfully receives the low quality video data and the destination node 2 (115) successfully receives the high quality video data and fails to receive the low quality video data, the low quality video data is output to the projector. The destination node 2 (115) should output the low quality video data to the project, but it has failed to receive the low quality video data. Therefore, in step S735, the video quality adjustment unit 355 extracts the low quality video data from the correctly received high quality video data, after that in step S740, the destination node 2 (115) outputs the low quality video data to the projector.

As illustrated in the frame configuration of FIG. 4, in a case where the high quality video data includes the compressed data and the loss data, only the compressed data may be used without using the loss data. As described above, the destination node 1 (110) and the destination node 2 (115) output the video data to the projector from both the destination nodes such that the video quality of the video data to be output is in accordance with the lower video quality among the video data correctly received. Accordingly, the video qualities of the video data output from the destination node 1 (110) and the destination node 2 (115) can be homogenized.

Figure 8:
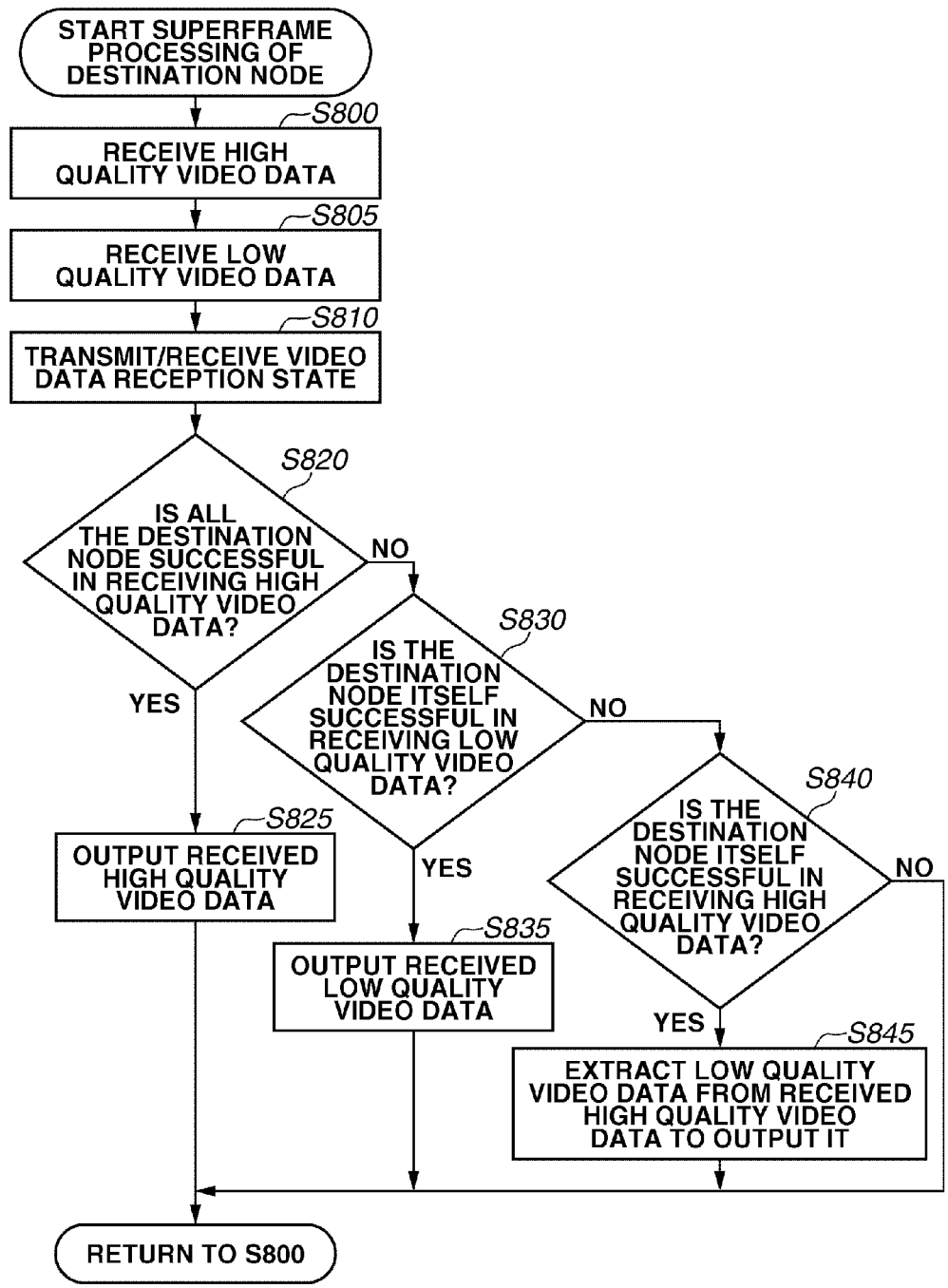
FIG. 8 is a flow chart illustrating an internal operation of a destination node according to the first and the second exemplary embodiments.

A detailed description is made as to the internal operation of the destination node per superframe unit with reference to a flow chart of FIG. 8.

In step S800, in each destination node, a high quality video reception unit 351 receives the high quality video data transmitted from the source node 100 and the reception state determined by the video reception state determination unit 353 is stored in the RAM 315. In step S805, the low quality video reception unit 352 receives the low quality video data transmitted from the source node 100 and the reception state determined by the video reception state determination unit 353 is stored in the RAM 315.

In step S810, the video reception state transmission/reception unit 354 transmits the stored reception states of its own high quality video data and low quality video data to the other destination node. Further, the video reception state transmission/reception unit 354 receives the reception states of the high quality video data and the low quality video data from the other destination node. In step S820, the video data selection unit 355 determines whether all the destination nodes successfully receive the high quality video data and selects the quality of data to be output. In a case where the video data selection unit 355 determines that all the destination nodes successfully receive the high quality video data (YES in step S820), in step S825, the high quality video data is output to the projector. Then, the processing returns to step S800 to perform the processing of receiving the next superframe 500.

In step S820, in a case where the video data selection unit 355 determines that any one of the destination nodes fails to receive the high quality video data (NO in step S820), the processing proceeds to step S830. In step S830, it is determined whether the destination node itself successfully received the low quality video data. In a case where it is determined that the destination node successfully received (YES in step S830), in step S835, the destination node outputs the low quality video data to the projector. Then, the processing returns to step S800 to perform the processing of receiving the next superframe 500.

In step S830, in a case where it is determined that the destination node itself fails to receive the low quality video data (NO in step S830), the processing proceeds to step S840. In step S840, it is determined whether the destination node itself successfully receives the high quality video data. In a case where it is determined that the destination node itself determines that it successfully receives the high quality video data (YES in step S840), in step S845, the video quality adjustment unit 360 extracts the low quality video data from thus received high quality video data to output it to the projector. Then, the processing returns to step S800 to perform the processing of receiving the next superframe 500.

As a result of the determination made in step S840, in a case where the destination node itself fails to receive the high quality video data (NO in step S840), the destination node fails to receive both the high quality video data and the low quality video data. Therefore, since there is no video data for reproducing, nothing is output to the projector and the processing is ended. Then, the processing returns to step S800 to perform the processing of receiving the next superframe 500.

As described above, the video quality of the video data to be output to the projector is controlled according to the quality of the video data received by each destination node, thereby realizing the homogenization of the video quality of the video data to be output to all the projectors.

A second exemplary embodiment will now be described. In the first exemplary embodiment, the high quality video data and the low quality video data are transmitted to the respective destination nodes by using the different communication paths. In the second exemplary embodiment, an example that the high quality video data and the low quality video data are transmitted by using a common communication path is described.

Figure 9:
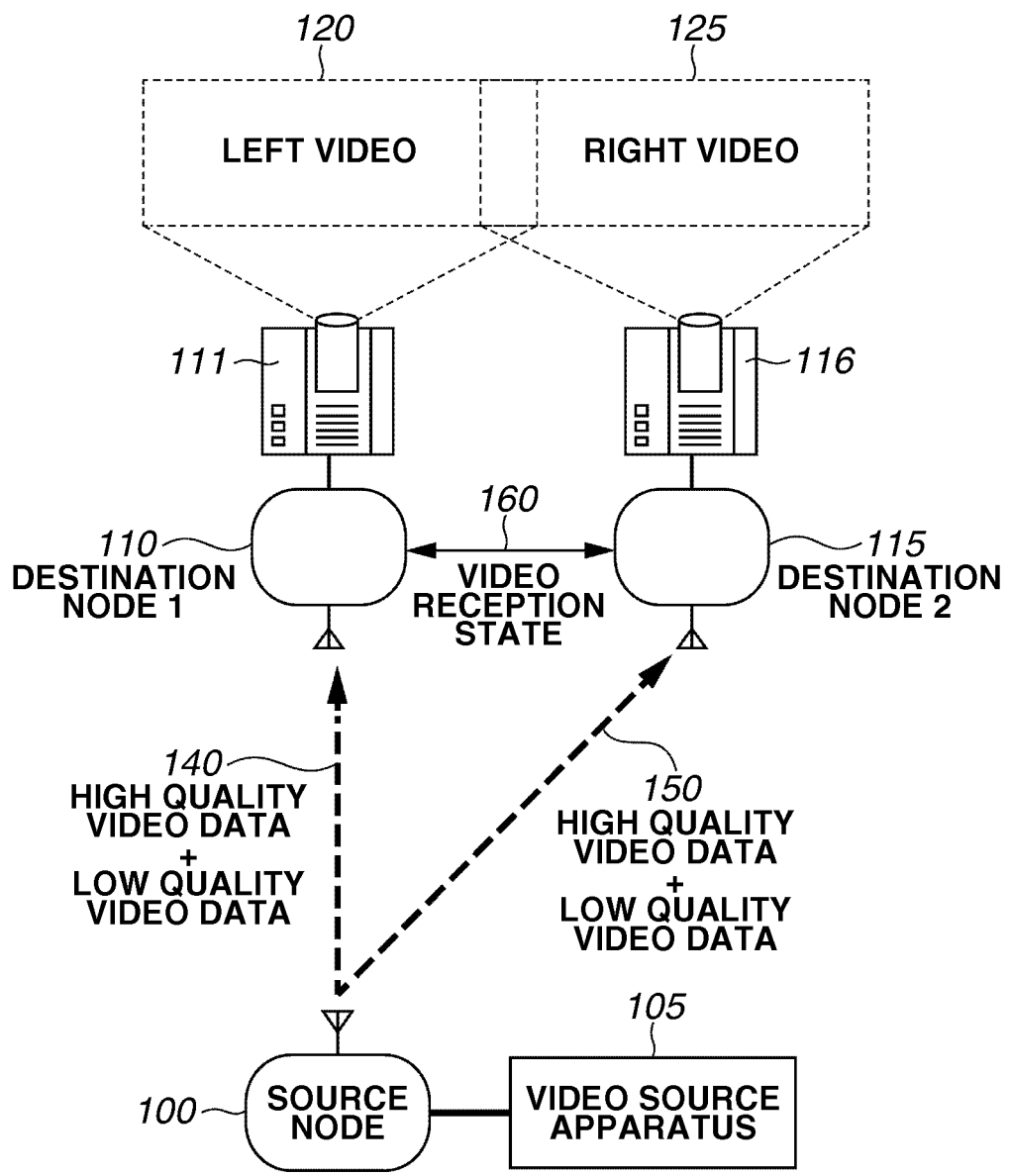
FIG. 9 illustrates a network configuration according to the second exemplary embodiment.

FIG. 9 illustrates a configuration of a network according to the present exemplary embodiment in which the source node 100 and each of the destination nodes are connected with each other via respective one communication path. The high quality video data and the low quality video data of the left video are transmitted by using a communication path 140 (i.e., path 1) and the high quality video data and the low quality video data of the right video are transmitted by using a communication path 150 (i.e., path 2). The source node 100, the destination node 1 (110), and the destination node 2 (115) are described above with reference to FIGS. 2 and 3, thus, detailed descriptions thereof are omitted herein.

Figure 10:
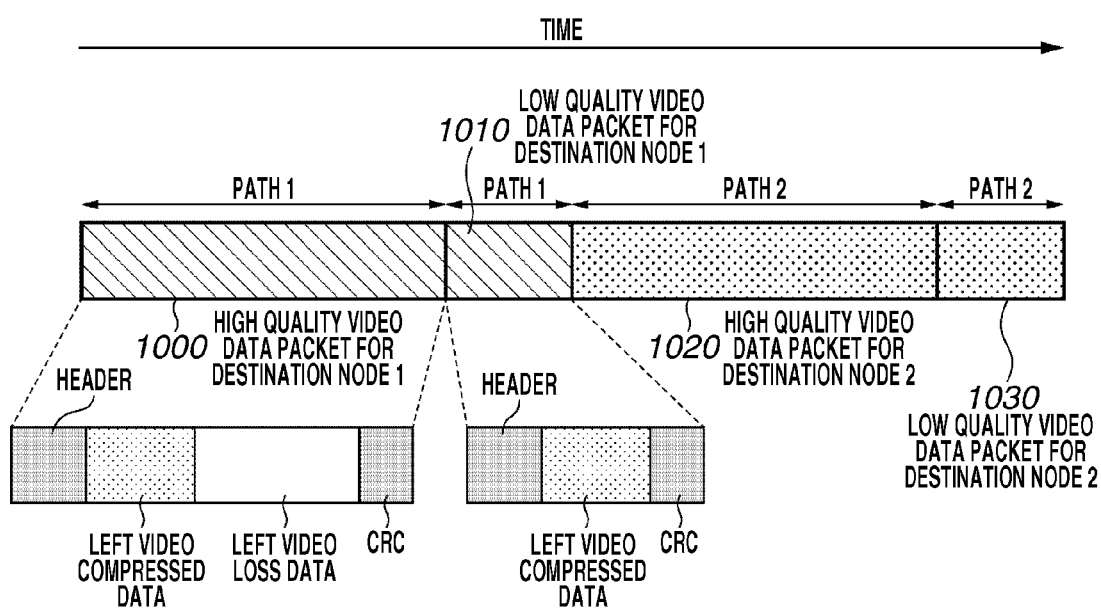
FIG. 10 illustrates a communication frame configuration according to the second exemplary embodiment.

FIG. 10 illustrates a configuration of the communication frame in a case where the communication area 510 for the video data transmission of the superframe 500 illustrated in FIG. 4 is applied to the present exemplary embodiment. An area 1000 is a high quality video data area of the left video for the destination node 1 (110). An area 1010 is a low quality video data area of the left video for the destination node 1 (110). The high quality video data of the left video and the low quality video data of the left video for the destination node 1 (110) are transmitted by using the same path 1. An area 1020 is a high quality video data area of the right video for the destination node 2 (115). An area 1030 is a low quality video data area of the right video for the destination node 2 (115). The high quality video data of the right video and the low quality video data of the right video for the destination node 2 (115) are transmitted by using the same path 2. Internal operations of the destination node 1 (110) and the destination node 2 (115) are different from the operations described in FIG. 8 in that the high quality video data and the low quality video data are received from the same communication path and the other operations thereof are identical to the operations described in FIG. 8 of the first exemplary embodiment. Therefore, the descriptions thereof are omitted here.

Also, in the present exemplary embodiment, the video quality of the video data to be output to the projector is controlled according to the reception state of each destination node, i.e., according to the video quality of the video data received by each destination node, so that the homogenization of the video quality of the video data to be output to all the projectors can be realized.

In the first and the second exemplary embodiments, the compressed data and loss data are transmitted as the high quality video data, however, uncompressed data may be transmitted as the high quality video data. In this case, in the processing of step S845 of FIG. 8, the video quality adjustment unit 360 provides compression processing to the high quality video data, generates the low quality video data, and outputs the generated low quality video data to the projector. An example of projecting the video by using the projector is described above, however, the video may be synthetically displayed in a display device such as a plurality of liquid crystal display monitors and the like.

An example of transmitting the high quality video data and the low quality video data is described above, however, the qualities of data may be separated into three or more qualities such as high quality video data, middle quality video data, and low quality video data to transmit them. In this case, also, each data is synthesized and output according to data having best quality in the data which has quality in common among the data received by the plurality of destination nodes. For example, if high quality video data and middle quality video data are received at a first destination node and middle quality video data and low quality video data are received at a second destination node, data having best quality among data having quality in common is the middle quality video data. Then the middle quality video data is synthesized and output. Further, if high quality video data, middle quality video data and low quality video data are received at the first destination node and low quality video data is received at the second destination node, data having best quality in the data having quality in common is the low quality video data. Then the low quality video data is synthesized and output, resulting in that a difference in quality of the data to be synthesized and output can be made unremarkable.

The video in the above description may be a moving image or a still image. However, in a case where a screen is not frequently switched (high in speed), even when the destination node fails to receive the video data, the destination node still can receive the high quality video data according to retransmission thereof. On the other hand, in a case where the screen is switched at a predetermined period with high speed, as in a case of the moving image, there is a case where the retransmission cannot be made in time to switch the screen. Therefore, according to the above-described embodiments, more excellent effect can be expected in a case where the moving image and still image are switched at high speed period.

In the above description, an example that each destination node functions as a determination device for determining and selecting the video quality of the video data to be output to the projector is described. However, it may be configured that at least one destination node selects the video quality and thus selected video quality is provided to the other destination node. For example, it may be configured that each destination node notifies one destination node of the reception state of the video data and the destination node having received this notification selects the video quality to notify another destination node of the selected video quality. The destination node having received the notification of the selected video quality can produce the same effect as far as the video having the notified video quality is output. Alternatively, a device different from the destination nodes may function as the determination device for determining and selecting the video quality. The device may be configured to collect the reception states of the video data of each destination node and to select the quality of the video data to be synthesized and output according to thus collected reception states to notify each destination node of the quality, thereby the video data having the quality notified being output by each destination node.

In the above description, the example that the video qualities of the divided pieces of video data are homogenized to be synthesized is described. However, it may be configured that, without homogenizing the video qualities, the video data having a quality close to a level in which the video is not unnatural to the sight when the video data thereof is synthesized and output is synthesized and output. In other words, each destination node may output the video data having a quality of a level close to each other.

According to the above description, in the system in which each of the plurality of pieces of video data to be synthesized and output is transmitted to the plurality of destination nodes after being divided into the plurality of qualities, the video qualities of the video data output by the plurality of destination nodes can be homogenized. Therefore, in a case of the system that transmits the plurality of pieces of video data of a single piece of video divided into a left video, a right video, an upper video, and a lower video, the video qualities of the divided pieces of video data can be homogenized to be synthesized. As a result thereof, the video that is unnatural to the sight can be prevented from being displayed. Also, in a case where portions of the divided pieces of video overlap each other and edge blending processing is provided thereto, a boundary of the video comes to be unremarkable. In a case where the plurality of pieces of video overlap each other for the 3D video and improving the luminance, since the plurality of pieces of video having the equivalent video qualities overlap each other, a degradation of a grade of video in its entirety comes to be unremarkable while the video disturbance of the low quality does not become remarkable.

The above description includes mere exemplary embodiments of the present invention. It is needless to say that the present invention is not limited to the above described exemplary embodiments.

In the present exemplary embodiment, the high quality video data and the low quality video data are transmitted by using the same communication medium. However, the high quality video data and the low quality video data may be transmitted by using different communication media. More specifically, for example, the high quality video data may be transmitted by using a wireless LAN and the low quality video data may be transmitted by using a public wireless access network. Alternatively, even with a wired communication, the same effect can be expected in a case where the transmission state is variable.

The present invention is also realized by executing the following processing. Namely, software (i.e., program) that realizes the above described functions of the exemplary embodiments is supplied to a system or a device via a network or a various storage media and a computer (or CPU or MPU) of the system or the device reads out and executes the program.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-020646 filed Feb. 2, 2011, which is hereby incorporated by reference herein in its entirety.

What is claimed is:

1. A communication system configured to divide a plurality of pieces of video data to be synthesized and output into a plurality of pieces of video having different qualities and transmit thereof to a plurality of output apparatus, the communication system comprising:
    a determination unit configured to determine a reception state of the video data in each output apparatus of the plurality of output apparatus;
    a decision unit configured to decide a quality of the video data to be synthesized and output according to the reception state of the video data in each output apparatus determined by the determination unit; and
    an output unit configured to output the video data having the quality decided by the decision unit, wherein, in a case where the video data is divided into a high quality video data and a low quality video data to be transmitted, the decision unit is configured, when any one of output apparatus among the plurality of output apparatus is determined to have failed to receive the high quality video data and the apparatus itself successfully receives either one of the high quality video data or the low quality video data, to decide to output the low quality video data.

2. An apparatus configured to decide a quality of video data to be synthesized and output in an output system configured to synthesize and output a plurality of pieces of video data by a plurality of output apparatus, the apparatus comprising:
    a determination unit configured to determine reception states of the video data of the plurality of output apparatus; and
    a decision unit configured to decide a quality of the video data to be synthesized and output according to the reception states of the video data in the plurality of output apparatus determined by the determination unit, wherein, in a case where the video data is divided into a high quality video data and a low quality video data to be transmitted, the decision unit is configured, when any one of output apparatus among the plurality of output apparatus is determined to have failed to receive the high quality video data and the apparatus itself successfully receives either one of the high quality video data or the low quality video data, to decide to output the low quality video data.

3. The apparatus according to claim 2, further comprising an output unit configured to output the video data having the quality decided by the decision unit.

4. The apparatus according to claim 2, further comprising a notification unit configured to notify the plurality of output apparatus of the quality of the video data decided by the decision unit.

5. The apparatus according to claim 2, wherein the decision unit is configured to decide the quality of the video data to be synthesized and output such that the qualities of the video data output by the plurality of output apparatus become homogeneous or close quality.

6. The apparatus according to claim 2, wherein the decision unit is configured to decide the quality of the video data to be synthesized and output such that video is synthesized and output according to the video data having a best quality in the video data which is able to be received by each of the plurality of output apparatus among the video data received by the plurality of output apparatus.

7. The apparatus according to claim 2, further comprising a quality adjustment unit configured to extract or generate video data having the quality decided by the decision unit from the video data successfully received.

8. A method for controlling an apparatus configured to decide a quality of video data to be synthesized and output in an output system for synthesizing and outputting a plurality of pieces of video data by a plurality of output apparatus, the method comprising:

determining reception states of the video data in the plurality of output apparatus; and deciding the quality of the video data to be synthesized and output according to the reception states of the video data in thus determined plurality of output apparatus, wherein, in a case where the video data is divided into a high quality video data and a low quality video data to be transmitted, the decision unit is configured, when any one of output apparatus among the plurality of output apparatus is determined to have failed to receive the high quality video data and the apparatus itself successfully receives either one of the high quality video data or the low quality video data, to decide to output the low quality video data.

9. A non-transitory computer-readable storage medium configured to store a program for controlling a decision device configured to decide a quality of video data to be synthesized and output in an output system for synthesizing and outputting a plurality of pieces of video data by a plurality of output apparatus, the program comprises:

determining reception states of the video data in the plurality of output apparatus; and deciding the quality of the video data to be synthesized and output according to the determined reception states of the video data in the plurality of output apparatus, wherein, in a case where the video data is divided into a high quality video data and a low quality video data to be transmitted, the decision unit is configured, when any one of output apparatus among the plurality of output apparatus is determined to have failed to receive the high quality video data and the apparatus itself successfully receives either one of the high quality video data or the low quality video data, to decide to output the low quality video data.

* * * * *